United States Patent [19]

Mollon et al.

[11] 4,006,362
[45] Feb. 1, 1977

[54] SHROUD FOR STORING RADIOACTIVE SPENT NUCLEAR FUEL CELLS

[75] Inventors: Leslie Mollon, Southfield; Keith R. Ball, St. Clair Shores, both of Mich.

[73] Assignee: Brooks & Perkins, Incorporated, Southfield, Mich.

[22] Filed: Nov. 17, 1975

[21] Appl. No.: 632,450

[52] U.S. Cl. .................................. 250/518; 176/87; 250/507
[51] Int. Cl.² ...................... G21F 3/00; G21C 11/00
[58] Field of Search .................. 250/506, 507, 518; 176/30, 87

[56] References Cited

UNITED STATES PATENTS

| | | | |
|---|---|---|---|
| 3,533,911 | 10/1970 | Fortescue et al. | 176/30 |
| 3,859,533 | 1/1975 | Suvanto | 250/518 X |

*Primary Examiner*—Archie R. Borchelt
*Attorney, Agent, or Firm*—Whittemore, Hulbert & Belknap

[57] ABSTRACT

A generally tubular shroud of rectangular cross-section having flat side walls formed by inner and outer tubes of rectangular cross-section spaced apart to provide a substantially uniform space therebetween, a flat aluminum-boron carbide sandwich received in and substantially filling the spaces at the four sides of the shroud. The inner and outer tube walls are in pressure contact with the inner and outer surfaces of the sandwiches. The side walls of the tube and sandwiches are interlocked by transversely extending elongated channels formed in the shroud walls including the inner and outer tube walls and the sandwiches. The invention includes a method in which after assembly, the parts are expanded in a die by very high pressure hydraulic pressure by means of a flexible bag, establishing the pressure contact and suitably folding end portions of the inner and outer tubes.

26 Claims, 19 Drawing Figures

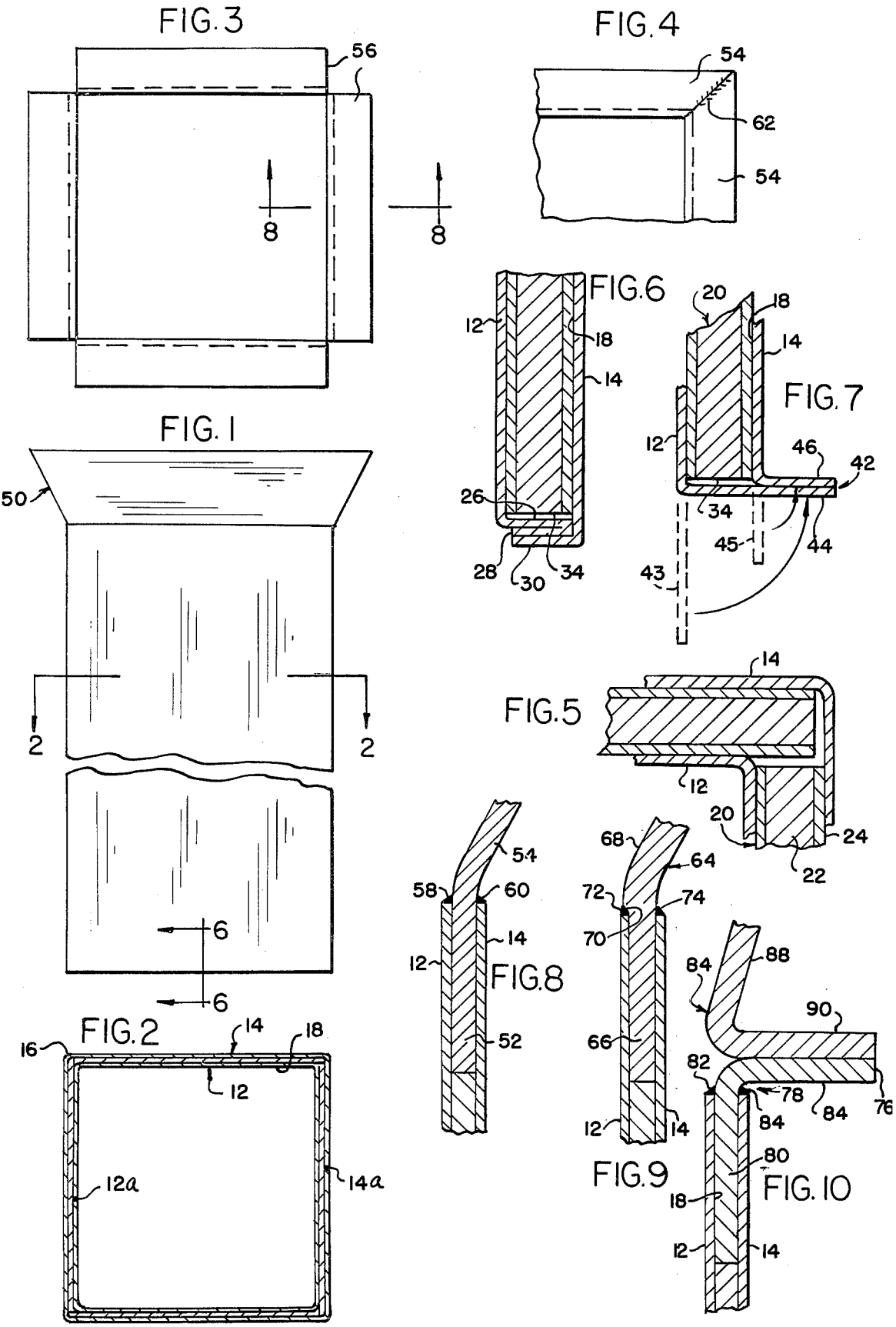

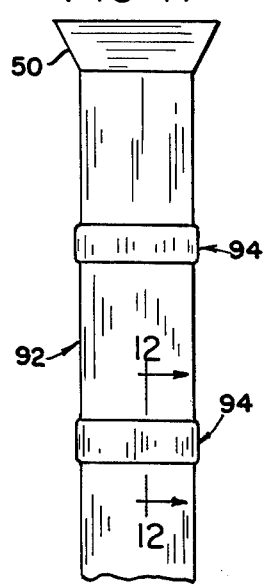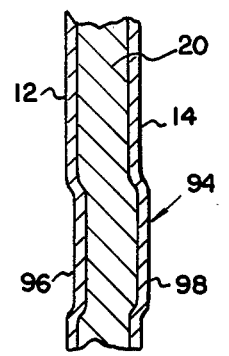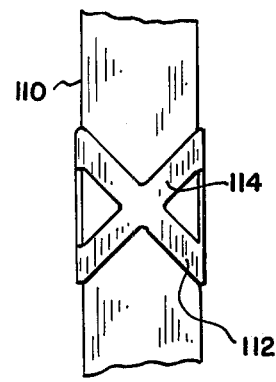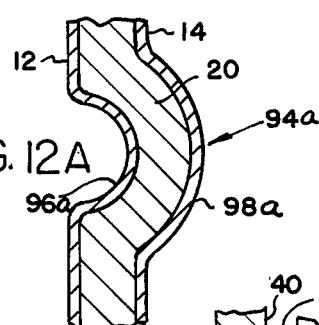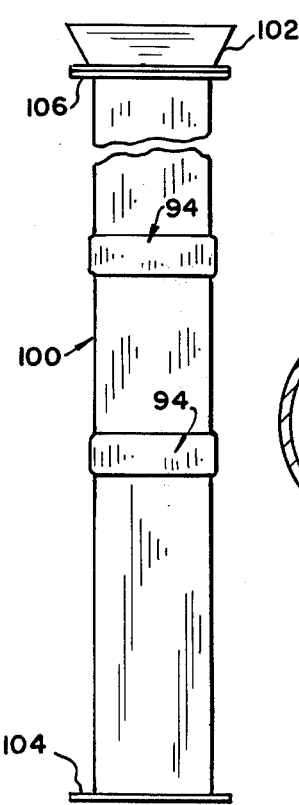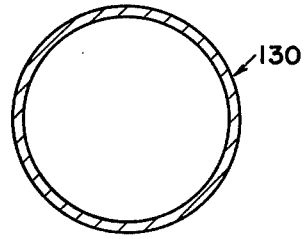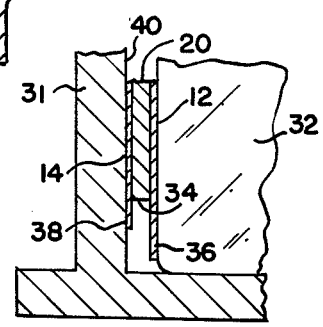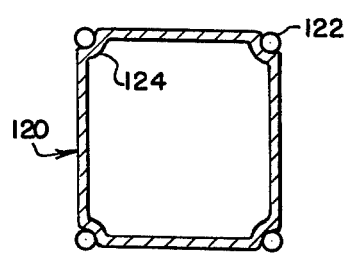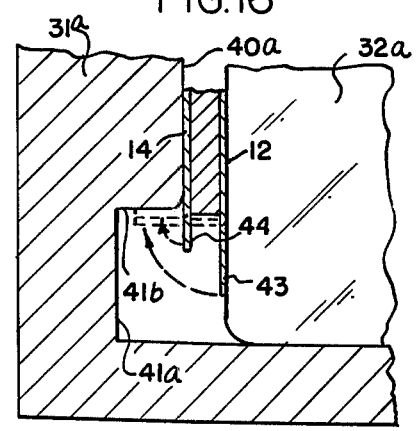

4,006,362

SHROUD FOR STORING RADIOACTIVE SPENT NUCLEAR FUEL CELLS

BRIEF SUMMARY OF THE INVENTION

The present invention relates to generally tubular shrouds for storing radioactive spent nuclear fuel cells. Such cells, after they have reached their useful life, remain highly radioactive and essentially emit neutrons. In order to provide for sufficient decay of the radioactive material to permit safe handling, the spent fuel cells are placed in generally tubular shrouds extending vertically in a pool of water which may if desired be borated to provide for more efficient neutron capture.

According to the present invention, each of the tubular shrouds is composed essentially of inner and outer metallic tubes, preferably formed of stainless steel, dimensioned to provide a space between the inner and outer tubes. Preferably, the shroud is of rectangular cross-section, as are each of the tubes, and accordingly, the four spaces provided at the sides of the shroud are generally flat elongated spaces. Sandwiches formed of outer layers of thin aluminum sheet and an intermediate layer of boron carbide are inserted into the spaces. The sandwiches are dimensioned to substantially completely fill the spaces with a suitable end overlap at the sides to prevent escape of neutrons.

The shrouds in use are disposed substantially vertically in the pool and the upper and lower ends of the spaces between the tubes are suitably sealed as for example by folding over longitudinally projecting end portions of one or both tubes beyond the adjacent end of the sandwich. The upper ends of the shrouds are provided with funnel constructions which include portions extending into the upper ends of the spaces between the tubes so as to provide an effective seal.

In manufacture of the shrouds the inner and outer tubes and aluminum-boron carbide sandwiches are assembled and the assembly placed within a suitable die structure. Thereafter, the interior of the shroud receives a flexible, preferably expandable hydraulic bag which is subjected to internal pressure sufficient to expand both the inner and outer tubes into conformity with the die and to bend or fold the longitudinally projecting end portion or portions of the tubes as desired. As a result of the very high pressure applied internally, the inner tube is expanded into solid pressure contact with the inner surfaces of the sandwiches and the sandwiches are accordingly retained in tight pressure and frictional contact with the inner surfaces of the walls of the outer tubes.

In order to provide for an even firmer interlock between the inner and outer tubes and the aluminum-boron carbide sandwiches, the inner die surface is provided with channels and the high pressure applied to the interior of the shroud deforms the shroud walls into these channels. Accordingly, a ridge appears at the outer surface of the shroud corresponding to the channel in the die and a corresponding groove appears at the inner surface of the inner tube. The material of the sandwich intermediate the deformed tube wall portions is likewise deformed.

Preferably, these inner channels and corresponding outer ridges extend transversely across a side wall of the shroud and preferably the channel-ridge construction forms a belt extending completely around the shroud. A plurality of such interlock belts are provided in longitudinally spaced relation on the shroud. As a modified construction, the channel-ridge construction may be provided to define X-shaped configurations.

BRIEF DESCRIPTION OF THE DRAWINGS

FIG. 1 is an elevational view of a storage shroud.
FIG. 2 is a section on the line 2—2, FIG. 1.
FIG. 3 is a plan view of the shroud shown in FIG. 1.
FIG. 4 is a fragmentary detail showing a variation in the shroud construction.
FIG. 5 is an enlarged sectional detail at a corner of the shroud.
FIG. 6 is an enlarged sectional detail taken on the line 6—6, FIG. 1.
FIG. 7 is a view similar to FIG. 6 showing a modified construction.
FIG. 8 is an enlarged fragmentary sectional view on the line 8—8, FIG. 3.
FIGS. 9 and 10 are enlarged sectional views similar to FIG. 8 showing modified constructions.
FIG. 11 is an elevational view illustrating a modified construction.
FIG. 12 is an enlarged fragmentary view on the line 12—12, FIG. 11.
FIG. 12A is a sectional view similar to FIG. 12 illustrating a different embodiment of the invention.
FIG. 13 is an elevational view of a modified form of shroud.
FIG. 14 is a fragmentary elevational view showing a further modified construction.
FIG. 15 is a diagrammatic view illustrating the method of shaping the shroud.
FIG. 16 is a view similar to FIG. 15 illustrating a modified method.
FIG. 17 is a transverse sectional view illustrating a further embodiment of the invention.
FIG. 18 is a diagrammatic view illustrating a shroud of generally cylindrical form.

DETAILED DESCRIPTION

Referring now to the drawings, the storage shroud indicated generally at 10, is of generally rectangular cross-section as best seen in FIG. 2, and comprises an inner rectangular tube 12 and an outer rectangular tube 14 each of which has four substantially flat side walls and abruptly rounded corners as indicated at 16. The tubes 12 and 14 are preferably formed of steel, particularly stainless steel, and are fabricated from a flat sheet bent to the illustrated configuration and having the edges welded together as indicated at 12a for the inner tube 12, and 14a for the outer tube 14.

The outside dimensions of the inner tube are smaller than the inside dimensions of the outer tube so that when the inner tube is centered with respect to the outer tube a substantial space 18 is provided at each side of the shroud.

The space 18 substantially completely filled with a panel designed for the purpose of absorbing neutrons emitted by radioactive fusible material in the fuel cell. Panels of this type are disclosed in Rockwell et al U.S. Pat. No. 2,727,996, and in general constitute a flat core 22 which is essentially boron carbide provided with thin sheets 24 of aluminum at opposite sides thereof.

As best seen in FIG. 5, these panels, designated generally 20, which in smaller scale Figures are herein hatched as unitary elements, are provided with lateral edges overlapped so as to minimize the escape of neutrons laterally from the spent fuel cell. While in FIG. 5 a space is indicated between the edge of one panel and the edge portion of the adjacent panel, preferably the panels are dimensioned so that the edges of the panels actually contact.

One of the important advantages of the present invention is that the shrouds are produced with close dimensional control as for example ±0.040″ on inside diameter. This is attributable to the method of production in which the elements making up the shroud are assembled with the four aluminum-boron carbide sandwiches or panels 20 interposed between the flat side wall portions of the inner and outer tubes. Thereafter, the assembly is positioned within a die dimensioned to provide the required outside dimensions of the shroud and pressure is applied to the interior of the shroud, specifically the interior of the inner tube 12, preferably by means of a water bag or other flexible and preferably yieldable bag containing liquid which is subjected to pressure. In practice the dimensions of the inner and outer tubes are slightly undersize. Pressure on the order of 5000 psi is applied by means of the hydraulic bag and has the effect of expanding both the inner and outer tubes. The outer tube of course is forced to conform to the cross-sectional shape of the die and the inner tube assumes a congruent shape but of smaller dimensions as determined by the thickness of the neutron absorbing panel interposed between the inner and outer tubes.

The application of controlled hydraulic pressure to the interior of the shroud is also used to produce a desired configuration at the lower end thereof.

As best seen in FIG. 6, the lower end of the space 18 between the inner and outer tubes is closed by suitably shaped lower portions of one or both of the tubes 12 and 14. As illustrated in this Figure, the lower end of the panel 20 initially terminates substantially above the lower ends of the inner and outer tubes. The lower end of the inner tube 12 is formed outwardly to provide an outwardly extending flange portion 26 and then reversely formed as indicated at 28 to form a flange of double thickness which extends completely across and abuts the inner surface of the side wall of the outer tube 14. The lower portion of the side wall of the outer tube 14 is formed to provide a flange 30 which extends laterally inwardly and overlies the double thickness flange formed by the flange portions 26, 28 of the inner tube 12. This provides a support structure capable of supporting the shroud and provides a reinforcement which avoids distortion of the lower end of the shroud. Flange portions 26, 28 and 30 are preferably suitably welded together to provide the illustrated construction.

Referring now to FIG. 15 there is illustrated the manner in which the flange construction 26, 28, 30 is partially formed by the application of internal pressure which expands the shrouud into conformity with the interior space of a die. In this Figure, a portion of the die is indicated at 31 provided at its interior with the hydraulic or water bag 32 to which pressure is applied in a well known manner. The lower end of the assembled elements of the shroud comprises a bottom edge 34 of the panel 20 and a lower portion 36 of the inner tube 12 which extends below the lower end 34 of the panel 20 as illustrated. The outer tube 14 also has a lower portion 38 extending below the lower end 34 of the panel 20 and conforms to the inner surface 40 of the die 31 and is somewhat shorter than the lower portion 36 of the inner tube 12.

When pressure is applied by means of the hydraulic bag 32 to expand the shroud assembly into conformity with the inner surface 40 of the die 31, the hydraulic pressure forms the downwardly extending end portions 36 of the inner tube to extend across the lower open end of the space 18, or in other words, to form the flange portion 26. At this time the flange portion 28 will extend downwardly against the downwardly extending portion 38 of the outer tube 14. After the construction is removed from the die 31 the flange portions 26 and 28 and the flange portion 30 formed by the end portion 38 of the outer tube, are shaped or bent to extend inwardly and to abut the flange portion 26 as shown in FIG. 6.

Referring now to FIG. 7 there is illustrated an alternative construction at the bottom of the shroud which provides an inwardly extending double thickness support flange indicated generally at 42. As seen in this Figure, the inner tube 12 has lower ends indicated in dotted lines at 43, which extend downwardly below the lower end 34 of the panel 20 and this portion is bent outwardly to form an end closure for the bottom of the space 18 between the tubes 12 and 14 and to form a flange portion 44. At the same time the bottom portion of the outer tube 14, a portion of which is indicated in dotted lines at 45, extends below the lower end 34 of the panel 20 and is bent outwardly to form the flange portion 46 together forming the flange 42.

It is important to seal the space 18 between the inner and outer tubes to prevent the water in the pool from entering the storage shroud. This is because the water is quite often borated to improve its neutron absorbing qualities and the borated water strongly attacks the aluminum sheath or surface portions 24 of the panels 20.

Referring now to FIG. 16 there is illustrated the method of producing the outwardly extending flange 42 and sealing the lower end of the space 18 between the tubes 12 and 14 as the shroud is subjected to internal hydraulic pressure in the die. In this Figure the die is illustrated at 31a having an inner wall 40a provided with a recessed portion 41a which as illustrated permits the application of hydraulic pressure from the hydraulic bag 32a to form the lower portions 43 and 44 of the tubes 12 and 14 outwardly as indicated in dotted lines against the horizontal die surface 41b.

It is understood of course that the die may be formed of two or more longitudinally separated portions to permit removal of the finally expanded and modified shroud therefrom.

It is desirable to provide a funnel construction at the upper end of the shrouds and these are illustrated in part in FIGS. 1, 3, 4, 10, 11 and 13.

Referring to the construction illustrated in FIGS. 1–3 and 8, the funnel construction indicated generally at 50 in FIG. 1 may be formed by a sheet metal funnel having lower portions 52 adapted to be received within the space 18 between the upper ends of the inner tubes 12 and the outer tubes 14. The portions 52 connect with upwardly and outwardly inclined guide or funnel portions 54 which as suggested in FIG. 3 may have a transverse dimension such that the ends 56 of the portions 54 leave a gap therebetween. The portions 52 of the funnel constitute a sealing closure for the upper end of the spaces between the shroud tubes 12 and 14 and of course also constitute a very strong reinforcement therefor. The upper edges of the tubes 12 and 14 are welded to the elements 52, 54 as indicated at 58 and 60.

An alternative construction is illustrated in FIG. 4 where the tunnel portions 54 are initially shaped to have end portions shaped to interfit and be interconnected by a weld connection as indicated at 62.

Referring now to FIG. 9 there is shown a construction which is quite similar to FIG. 8 with the exception that the funnel forming element indicated generally at 64 has its lower portion 66 of a width to be received between the inner and outer tubes 12 and 14 but has its upper portions 68 somewhat thicker and disposed to provide a shoulder at 70 which overlies the upper edge of the inner tube 12 so as to provide a smooth continuous inner surface extending across the funnel to the interior of the storage shroud. Again, the funnel forming element 64 is welded to the upper edges of the inner and outer tubes 12 and 14 as indicated at 72 and 74.

Referring now to FIG. 10 there is illustrated a further modification in which the funnel construction is so arranged as to provide an outwardly extending upper support flange indicated generally at 76 which may cooperate with the internally extending bottom support flange 44 previously described.

In the construction illustrated in FIG. 10 the funnel construction comprises a sealing and support element 78 having a downwardly extending closure portion 80 adapted to extend into the space 18 between the upper portions of the inner and outer tubes 12 and 14. Element 78 is welded to the upper edges of the tubes 12 and 14 as indicated at 82 and 84. The element 78 includes an outwardly extending support flange portion 85 which as illustrated is extended horizontally. The funnel element 86 includes an upwardly and outwardly inclined funnel forming portion 88 and it also includes an outwardly extending support portion 90 adapted to engage the support flange portion 85 in surface-to-surface contact and to provide the double thickness outwardly extending flange 76.

The funnel forming portions in all of the embodiments previously described are preferably formed of stainless steel and are adapted to be welded efficiently to the stainless steel tubes 12 and 14 as previously described.

Referring now to FIGS. 11 and 12 there is illustrated a modification of the storage shroud here indicated in its entirety at 92. In this Figure the upper funnel construction is indicated at 50, which may be of any of the types described in connection with FIGS. 8–10.

As previously stated, the method of production of the shroud tubes by the application of very high internal hydraulic pressure results in accurate dimensioning of the shroud into conformity with the die and also in particular results in the capability for maintaining internal dimensions of the shroud to close tolerances. As an additional advantage of the method of application, the final assembly after removal from the die is one in which the shroud components; namely, the inner and outer tubes and the intermediate panels, are in pressure contact and hence, are frictionally interlocked. The assembly is further integrated by the connection of the funnel forming elements to the upper edge of the inner and outer tubes and by the interconnection between horizontally extending closure and flange portions at the lower ends of the shroud. However, it is preferred to provide a further mechanical interlock between the side walls of the inner tube, the intermediate panels, and the side walls of the outer tube. This construction may conveniently be provided by appropriate shaping of the die 31.

As best shown in FIG. 12, an interlock belt indicated generally at 94 is provided, preferably extending perpendicular to the length of the shroud and including four interconnected portions, one at each side of the square cross-section shroud. The interlock formation comprises laterally outwardly deformed portions of the inner tube 12, the panel 20, and the outer tube 14 as illustrated. This provides at the interior of the shroud an internal channel 96 and this configuration is imparted also to the panel 20 and the outer tube 14, producing an outwardly extending rib 98 at the exterior of the storage shroud. In practice, it is found that a satisfactory interlock is provided where the channel has a depth of approximately 0.060 inch, this producing a rib 98 of comparable height.

In FIG. 12A there is illustrated a construction in which the formation 94a produces a channel at 96a having a depth approximately equal to the thickness of the panel 20 and producing an exterior bead 98a of comparable dimension. The reinforcing beads may terminate at each corner or may extend around the corners.

In FIG. 13 there is illustrated a shroud indicated generally at 100 having a funnel construction indicated at 102 at its top. In this embodiment of the invention outwardly extending support flanges are provided, the bottom flanges being indicated at 104 and the upper flanges being indicated at 106. The upper flange 106 may be provided as previously described in connection with FIG. 10, and the lower flanges may be provided as previously described in connection with FIG. 7. However, the lower flanges 104 may if desired, be provided by the insertion of support elements of L-shaped cross-section similar or identical to the elements 78 described in conjunction with FIG. 10, thus providing exceptionally strong reinforcement for the lower end of the shroud as well as simultaneously providing for a sealing closure at the lower end of the space 18 between the tubes.

The reinforcing interior channels 96 and external ribs 98 have been so far described as extending in a belt completely around the shroud. However, in some cases, advantages are obtained by providing these reinforcing channels and ribs in a form in which they extend diagonally across a flat side of the shroud. Such an arrangement is illustrated in FIG. 14 where one such diagonally extending reinforcement is indicated on the shroud 110 and 112. This Figure indicates a second diagonally extending reinforcement 114 crossing the reinforcement 112 to provide an X-shaped compound reinforcement which not only interlocks the three elements making up the shroud but also provides for increased stiffness of the side walls thereof.

In some cases these shrouds are supported in the pools of water in specially constructed frames and in one such construction the frame includes vertical cylindrical ribs or pipes arranged at four corners of a square and intended to provide support for one or more shrouds.

In FIG. 17 there is illustrated the cross-sectional shape of a shroud 120 intended to be engaged and supported by a plurality of vertically extending frame elements 122 which may be in the form of pipes. For this purpose, the shroud 120 is recessed at the exterior of each corner as indicated at 124, the depth of such recesses being such that the frame elements 121 are completely received within projections of the outer surface of the shroud. It will be understood that this configuration of the shroud is readily produced by appropriate conformation of the die in which the shroud elements are subjected to pressure.

In the embodiments of the invention previously described, the shroud is of generally tubular configuration but of square cross-section. This construction offers many advantages but it is to be understood that the invention is not limited to a shroud of cross-section. For example, it is possible to produce a shroud of circular cross-section as indicated at 130 in FIG. 18. It will of course be understood that the shroud diagrammatically illustrated in this Figure includes an anner tube of stainless steel and of circular cross-section, an outer tube of stainless steel and of circular cross-section, and an intermediate ply of neutron absorbing material such as the aluminum-boron carbide sandwich previously described, which in this case may be formed in one or more panels of arcuate cross-section. It will of course be understood that the structural features previously described in connection with the shroud of square cross-section are equally applicable to the shroud of circular cross-section. Thus, the reinforcing ribs 94 or 94a may be provided to extend completely around the cylindrical shroud and the funnel constructions may be of circular shape in horizontal cross-section. The closure of the upper and lower ends of the tubular construction may be carried out as described in connection with the shroud of square cross-section.

It will be understood that where it is desired to position the shrouds with minimum spacing, the funnel constructions may be modified or eliminated to permit adjacent shrouds to have their outer surfaces in contact.

While the dimensions may vary in accordance with dimensions of fuel cells and for other reasons, the height of the shroud is such that it will receive a 14-foot panel or sandwich of boron carbide and aluminum. The transverse dimensions of the square cross-section shroud may be somewhat less than 12 inches. The stainless steel sheet material of which the inner and outer tubes are formed has a thickness of approximately 0.018 inch, and the panel or aluminum-boron carbide sandwich has a thickness of approximately 0.135 inch.

As previously mentioned the boron carbide material forming the core of the sandwich is provided with aluminum sheaths. The inner and outer tubes of the shroud are formed of stainless steel as is the funnel construction at the upper end and the support flange structure where separately provided at the lower end. Thus, efficient welding between the material of the tubes of the shroud and the funnel and special bottom flange where used, is readily provided.

By the present construction, the shrouds, while of relatively small wall thickness and of relatively great length and substantial width are reinforced against distortion so that substantially uniform spacing between the inner surface of the shroud and the outer surface of a fuel cell is provided. This is important to permit thermal circulation of water through the shroud and over the outer surface of the spent fuel cells or the containers therefor. The present construction also has the important advantage of maintaining inside dimensions to close tolerances both as to shape and dimensions, in order to provide the essential substantially uniform clearance with respect to the fuel cells.

Since each shroud includes a complete lateral enclosure of a substantial thickness of boron carbide, it is possible to provide much closer storage than has heretofore been possible. It has previously been the practice to provide spent fuel cells with approximately 22 inches center-to-center spacing. With the present construction, in which the continuous panels of aluminum-boron carbide are provided at each side of the shroud, a center-to-center storage of fuel cells will be less than 11 inches. This of course affords the possibility of quadrupling the number of cells that can be stored in a given space. Since the storage space required for spent fuel cells poses a different problem in connection with atomic power facilities, this increased capacity of available storage area is of extreme importance.

What we claim as our invention is:

1. A generally tubular shroud for storing radioactive spent nuclear fuel cells in pools, said shroud being of uniform cross-section, said shroud comprising an outer tube, an inner tube within said outer tube, said tubes forming inner and outer spaced apart side walls of said shroud, and dimensioned to provide a uniform spacing between the inner and outer side walls thereof, and neutron absorbing panel material substantially filling the spaces between the inner and outer side walls of said shroud, the side walls of said tubes being in pressure contact with the sides of said panels.

2. A shroud as defined in claim 1 in which said shroud in use is positioned vertically in the storage pool, the lower edges of at least one of said tubes extending across the lower edges of said panels to said other tube and being secured thereto to form a seal.

3. A shroud as defined in claim 2, the lower edge of said inner tube being shaped to extend outwardly across the lower end of the space between said inner and outer tubes.

4. A shroud as defined in claim 3, the lower edge of said outer tube extending inwardly to overlie the outwardly extending edge of said inner tube.

5. A shroud as defined in claim 3, the lower edge of said inner tube beyond the portion outwardly extending across the end of the space between said inner and outer tubes being folded back to form a double thickness of material across the lower end of said space, and the lower edge of said outer tube extending inwardly to overlie the said double thickness of material.

6. A shroud as defined in claim 3, the lower edges of said tubes being shaped to extend outwardly of said shroud to form a double thickness support flange and to seal the lower end of said space.

7. A shroud as defined in claim 1, said tubes each being formed of stainless steel sheet material bent at four corners to form flat side walls, the edges of said tubes being welded together intermediate the corners of the tube.

8. A shroud as defined in claim 7, said tubes each being formed of stainless steel sheet material having a thickness of about 0.018 inch.

9. A shroud as defined in claim 1, said shroud having an interlock formation comprising an elongated channel formed in matching portions of said inner and outer tubes and panels.

10. A shroud as defined in claim 9 in which said channels are at the inside of said shroud and extend transversely of the side walls.

11. A shroud as defined in claim 10, said channels in the individual side walls forming a belt extending completely around said shroud.

12. A shroud as defined in claim 11 in which a plurality of channels are provided spaced longitudinally of said shroud.

13. A shroud as defined in claim 9 in which a pair of crossing diagonally extending interlock channels are provided in a flat wall of said shroud.

14. A shroud as defined in claim 7, said shroud including a funnel construction comprising an upwardly and outwardly inclined surface at the upper end of each side wall of the shroud substantially forming a continuation of the inner surface of said inner tube.

15. A shroud as defined in claim 14, the walls of said funnel construction being formed of stainless steel having a thickness approximately equal to the spacing between the side wall of said tubes.

16. A shroud as defined in claim 15, said funnel construction including lower wall portions received in the space between the upper edge portions of said tubes.

17. A shroud as defined in claim 16, the portion of said funnel construction at the inner side thereof received between said tubes being recessed to provide a smooth continuous surface at the inner side of said shroud and funnel.

18. A shroud as defined in claim 14, said funnel including support flanges extending outwardly from the upper end of each side of said shroud, a flange support and sealing member of L-shaped cross-section having one leg received in the upper end of the space between said inner and outer tubes and the other leg extending outwardly generally perpendicular to the side wall of said shroud, said first leg constituting a seal for the upper end of said space, the other leg connected to the outwardly extending support flange of said funnel.

19. A shroud as defined in claim 18, comprising a bottom support and seal L-shaped cross-section having one leg received in the lower end of the space between said inner and outer tubes, the other leg extending outwardly to constitute a bottom shroud support.

20. The method of making shrouds for storing radioactive spent nuclear fuel cells which comprises assembling together inner and outer tubes dimensioned to provide uniform generally rectangular flat spacing between the side walls thereof and panels of neutron absorbing material substantially filling the space between said tubes, placing the assembly in a die having a cavity conforming to the desired final outside dimension of the shroud, applying essentially hydraulic pressure to the interior of said inner tube, to shape the assembly into conformity with the die and to establish permanent pressure and frictional contact between adjacent surfaces of said tubes and panels.

21. The method as defined in claim 20 which comprises providing a die having a cavity somewhat larger in cross-section than the outer tube as assembled, and expanding the inner tube into pressure contact with said panel and expanding said outer tube into contact with the walls of said cavity.

22. The method as defined in claim 20 which comprises initially forming the tubes by bending sheet material into tubular form and joining the edges thereof by welding along a seam extending longitudinally thereof.

23. The method as defined in claim 20 which comprises forming an end closure to the space at one end of the shroud between the inner and outer tubes by causing the ends of at least said inner tube to extend beyond the adjacent end of the panel, and applying confined hydraulic pressure to the inner surface of said extending portion of the inner tube to shape said portion outwardly across the space.

24. The method as defined in claim 20 which comprises simultaneously forming an outwardly extending support flange of a thickness double the wall thickness of the tube material, by providing a recess in the die having a surface extending outwardly adjacent an end of the die cavity, causing the ends of both inner and outer tubes to extend beyond the adjacent ends of the panels, and applying hydraulic pressure by means of a flexible bag to the inner surface of the extending portion of the inner tube to form said extension and the extension of the outer tube into the die recess so that the extensions of said inner tubes extend across the bottom of the opening between inner and outer tubes and the extensions of both tubes form outwardly extending flanges of double thickness as aforesaid.

25. The method as defined in claim 20 which comprises forming an end closure to the space at one end of the shroud between the inner and outer tubes by causing the ends of the side walls at both inner and outer tubes to extend beyond the adjacent ends of the panels, applying confined hydraulic pressure to the inner surfaces at the extension of the inner tube to form such extension across the bottom of the opening between the inner and outer tubes and into abutment with the longitudinal extension of the outer tube, removing the shroud from the die, and reversely folding the abutting longitudinally extending portions of both tubes back across the space between inner and outer tubes to provide an end closure having a thickness triple the wall thickness of the tubes.

26. The method as defined in claim 20 which comprises providing an elongated channel-rib reinforcement and interlock in a side wall of the shroud which comprises providing an elongated channel extending transversely of a side surface of the die cavity, and applying sufficient hydraulic pressure to the inner surface of said inner tube to form conforming elongated channels at the inner side of said inner tube, panel and outer tube, and to form conforming elongated ribs at the outer side thereof by displacing material of the shroud into the channel in the side surface of the die.

* * * * *